(12) United States Patent
Holtzapple et al.

(10) Patent No.: US 8,137,955 B2
(45) Date of Patent: Mar. 20, 2012

(54) METHOD FOR HEAT RECOVERY FROM PRE-TREATED BIOMASS

(75) Inventors: Mark T. Holtzapple, College Station, TX (US); Cesar B. Granda, College Station, TX (US)

(73) Assignee: The Texas A&M University System, College Station, TX (US)

( * ) Notice: Subject to any disclaimer, the term of this patent is extended or adjusted under 35 U.S.C. 154(b) by 604 days.

(21) Appl. No.: 12/262,282

(22) Filed: Oct. 31, 2008

(65) Prior Publication Data

US 2009/0114591 A1    May 7, 2009

Related U.S. Application Data

(60) Provisional application No. 60/985,059, filed on Nov. 2, 2007.

(51) Int. Cl.
*C12P 1/00* (2006.01)
*B01J 19/00* (2006.01)
*B01J 10/00* (2006.01)
*C05F 11/08* (2006.01)
*C08B 30/00* (2006.01)

(52) U.S. Cl. .......... 435/267; 210/612; 422/198; 422/60; 71/8; 71/9; 71/10; 127/34; 127/43; 127/44; 127/50

(58) Field of Classification Search .................. 435/267; 210/612; 422/198, 600; 71/8–10; 127/34–71
See application file for complete search history.

(56) References Cited

U.S. PATENT DOCUMENTS

| 4,565,552 | A  | * | 1/1986  | Cotton .......................... 48/197 A |
| 4,980,029 | A  | * | 12/1990 | Bolz et al. ...................... 202/105 |
| 5,693,296 | A  |   | 12/1997 | Holtzapple et al. |
| 6,464,875 | B1 | * | 10/2002 | Woodruff ....................... 210/603 |
| 6,588,349 | B1 | * | 7/2003  | Ahtila et al. ................... 110/224 |

FOREIGN PATENT DOCUMENTS

EP        0769561       4/1997

OTHER PUBLICATIONS

PCT Notification of Transmittal of The International Search Report and the Written Opinion of the International Searching Authority, or the Declaration; PCT/US2008/082011; 11 pages; dated Feb. 12, 2009.

* cited by examiner

*Primary Examiner* — Nathan Bowers
*Assistant Examiner* — Gautam Prakash
(74) *Attorney, Agent, or Firm* — Timothy S. Westby; Porter Hedges LLP

(57) ABSTRACT

According to one embodiment, a method for heat treatment of a biomass includes allowing biomass in a pretreatment reactor to undergo a pre-treatment reaction process. The pre-treatment reaction process yields pretreated biomass along with soluble components. A first liquid having a first temperature is transported into the pretreatment reactor and the pre-treated biomass elevates the first temperature to a second temperature. At least a portion of the soluble components are captured in the first liquid, and the at least a portion of the soluble components in the first liquid and the first liquid are removed from the pretreatment reactor. A second liquid having a third temperature is transported into the pretreatment reactor and the pretreated biomass elevates the third temperature to a fourth temperature, the fourth temperature being less than second temperature.

13 Claims, 5 Drawing Sheets

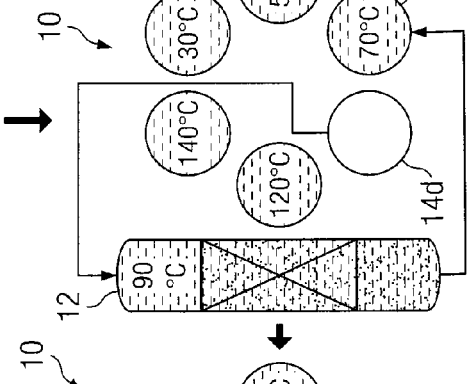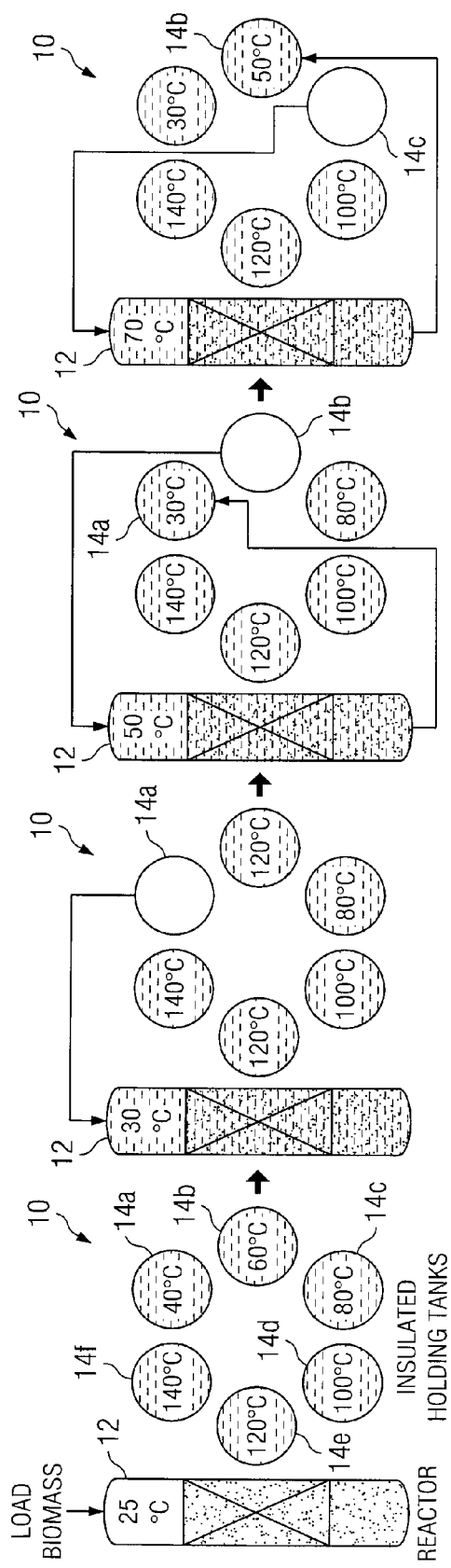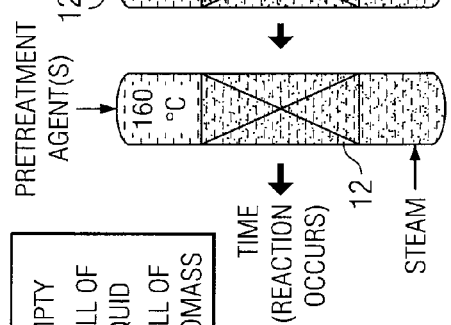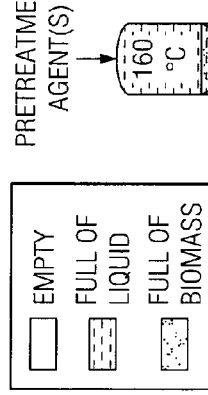

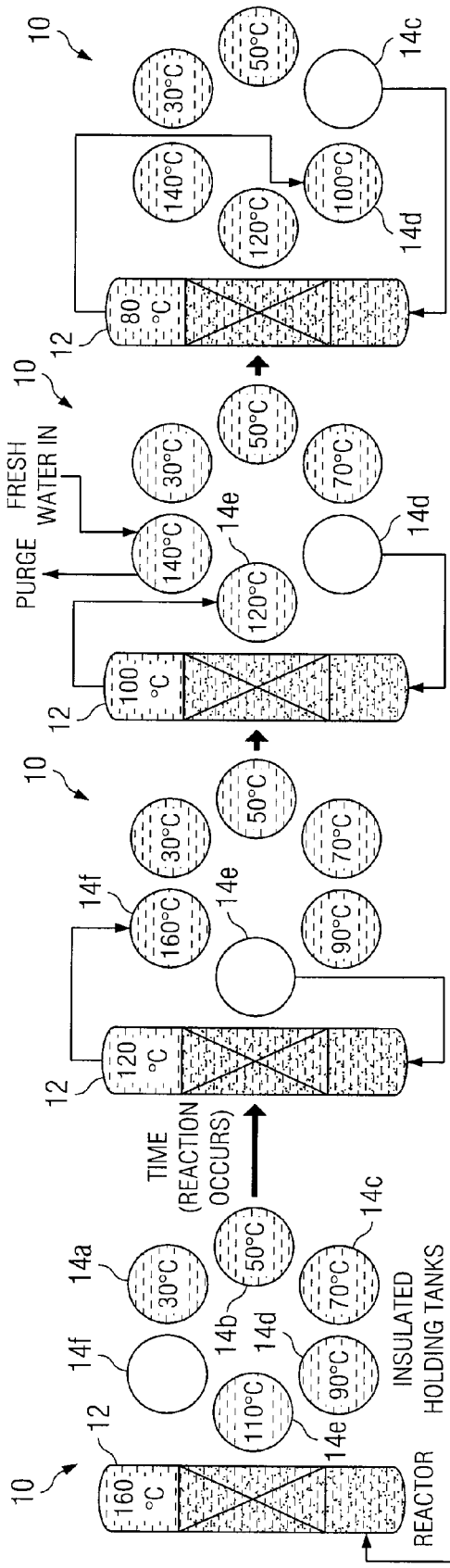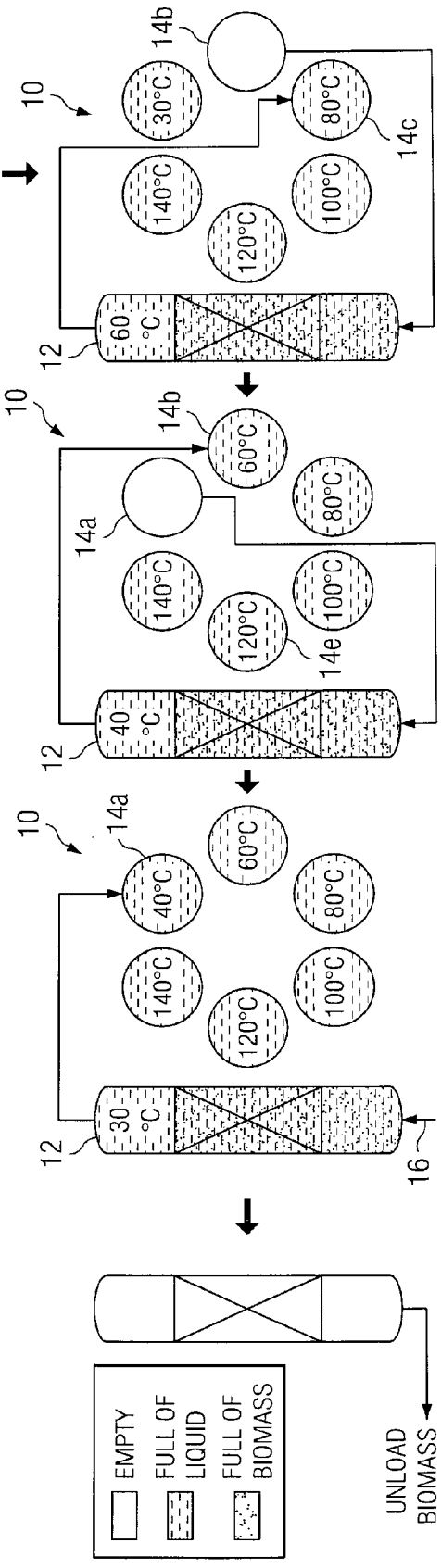

US 8,137,955 B2

METHOD FOR HEAT RECOVERY FROM PRE-TREATED BIOMASS

CROSS-REFERENCE TO RELATED APPLICATIONS

Pursuant to 35 U.S.C. §119 (e), this application claims priority from U.S. Provisional Patent Application Ser. No. 60/985,059 entitled BIOMASS PRETREATMENT SYSTEM, filed Nov. 2, 2007.

TECHNICAL FIELD OF THE DISCLOSURE

This disclosure generally relates to biomass processing, and more particularly, to a system and method for pretreating biomass.

BACKGROUND OF THE DISCLOSURE

A variety of technologies exist to treat biomass. Oftentimes, prior to such "treating" of biomass, the biomass is "pretreated" in order to enhance biodigestibility of the biomass during treatment. The biomass pretreatment process can be performed in a reactor at high temperatures and pressures in the presence of a liquid. Certain agents, such as acids, alkalis, and oxidizers are often used to enhance this process. Example pretreatment processes include, but are not limited to, those that are base catalyzed (ammonia, alkaline-peracetic acid, alkaline peroxide, alkaline-solvent, lime, lime under oxygen pressure, sodium hydroxide), non catalyzed (autohydrolysis, hot water, hot water –pH neutral, steam), acid catalyzed (concentrated or dilute acid using sulfuric acid, hydrochloric acid, peracetic acid, phosphoric acid, sulfur dioxide), solvent based (organosolv, other solvents), and chemical based (peroxide, wet oxidation).

SUMMARY OF THE DISCLOSURE

According to one embodiment, a method for heat treatment of a biomass includes allowing biomass in a pretreatment reactor to undergo a pre-treatment reaction process. The pretreatment reaction process yields pretreated biomass along with soluble components. A first liquid having a first temperature is transported into the pretreatment reactor and the pretreated biomass elevates the first temperature to a second temperature. At least a portion of the soluble components are captured in the first liquid, and the at least a portion of the soluble components in the first liquid and the first liquid are removed from the pretreatment reactor. A second liquid having a third temperature is transported into the pretreatment reactor and the pretreated biomass elevates the third temperature to a fourth temperature, the fourth temperature being less than second temperature.

Certain embodiments of the invention may provide numerous technical advantages. For example, a technical advantage of one embodiment may include the capability to gradually cool and heat biomass in a reactor while efficiently recovering heat. Other technical advantages of other embodiments may include the capability to simultaneously allow the extraction and removal of soluble species generated during pretreatment in a reactor. Yet other technical advantages of other embodiments may include the capability to employ a technique known as "displacement extraction" to recover both heat and soluble species, letting liquid present in the biomass to be displaced by incoming liquid without any mixing, thus allowing a more efficient extraction and heat recovery. Still yet other technical advantages of other embodiments may include the capability to utilize hydrostatic head of liquid to keep the biomass particles interstitial spaces filled with liquid at all times, thus excluding air, allowing percolation rates to be much faster than when liquid is simply allowed to drain. Still yet other technical advantages of other embodiments may include the capability to employ an efficient mass transfer technique to efficiently recover heat and soluble species from the pretreated biomass. Still yet other technical advantages of other embodiments may include the capability to avoid the use of expensive dewatering equipment, such as screw presses or roller mills for extraction. Still yet other technical advantages of other embodiments may include the capability to avoid the use of expensive heat exchangers. Still yet other technical advantages of other embodiments may include the capability to provide a simple heat and soluble species recovery system, which can operated using pumps and opening and closing of valves. Still yet other technical advantages of other embodiments may include the capability to provide a system that can be flexibly applied to many different pretreatment technologies.

Although specific advantages have been enumerated above, various embodiments may include all, some, or none of the enumerated advantages. Additionally, other technical advantages may become readily apparent to one of ordinary skill in the art after review of the following figures and description.

BRIEF DESCRIPTION OF THE DRAWINGS

A more complete understanding of embodiments of the disclosure will be apparent from the detailed description taken in conjunction with the accompanying drawings in which:

FIGS. 1A through 1H show one embodiment of a biomass pretreatment system in which a biomass may undergo a heating cycle;

FIGS. 2A through 2H show the biomass pretreatment system of FIGS. 1A through 1H in which a biomass may undergo a cooling cycle;

DETAILED DESCRIPTION OF EXAMPLE EMBODIMENTS

Figure 3:
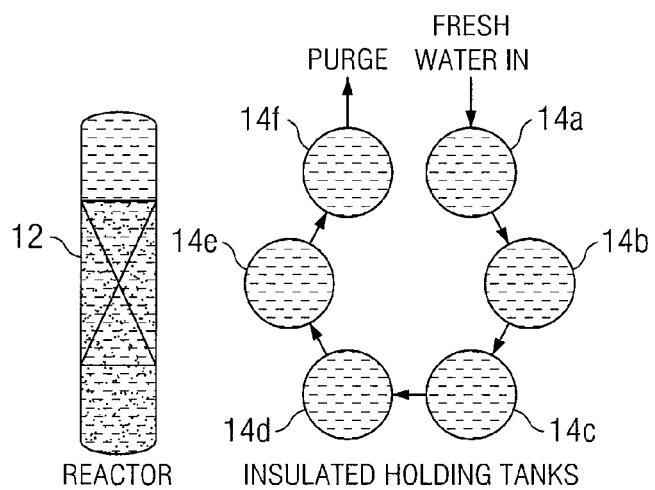
FIG. 3 shows one embodiment of a purging process for each of the tanks of the biomass pretreatment system of FIGS. 1A through 1H.

It should be understood at the outset that, although example implementations of embodiments of the invention are illustrated below, the present invention may be implemented using any number of techniques, whether currently known or not. The present invention should in no way be limited to the example implementations, drawings, and techniques illustrated below. Additionally, the drawings are not necessarily drawn to scale.

In practice, optimal heat recovery occurs between two liquids in heat exchangers. Because turbulence can easily be generated in liquids, heat transfer is relatively efficient. When dealing with gases, heat recovery using heat exchangers is also feasible, although heat transfer aids, such as fins, might be needed. In contrast, exchanging heat from solids is difficult, except in specialized cases, such as powders, which have a certain degree of fluidity, and, under certain conditions, allow enough mixing for turbulence to form. Some solids can, however, be easily slurried with an adequately small amount of liquid, which would increase their fluidity and thus allow heat transfer to occur in a heat exchanger. However, other solids, such as fibrous biomass, need a very large amount of liquid for slurrying (>25 times the amount of solid), which, because of the volumes, are cost prohibitive and inconvenient. With such solids, the best way to achieve heat transfer is to allow direct intimate contact of the solid and the heat transfer fluid. For instance, in gasification technology, fluidized bed and entrained gasifiers allow direct contact of the fluid (i.e., air) with the fibrous biomass, allowing efficient heat transfer.

In biomass pretreatment technology, where a hot liquid might be employed (e.g., water), this liquid is the preferred heat transfer fluid. Some heat transfer may be attempted by removing the liquid in the reactor after the pretreatment has occurred and reusing this same liquid in the next pretreatment cycle. However, the heat present in the biomass and the entrained water can not be recovered efficiently. In addition, soluble species released during pretreatment can not be efficiently removed. Accordingly, teachings of certain embodiments recognize the use of displacement extraction where little, if any, axial mixing occurs, allowing recovery of the liquid present in a biomass bed without decreasing the liquid temperature or soluble species concentration. Additionally, teachings of certain embodiments recognize that through the use of several stages, the recovery of both heat and soluble products may be almost complete.

Displacement extraction is a process in which differing liquids may displace one another without significant mixing. The displacement extraction process may use a Meichage effect for example, to extract sugar from sugarcane, as described in U.S. Pat. No. 5,772,775. Using the Meichage effect, U.S. Pat. No. 5,772,775 describes transporting a bed of ground sugarcane from an inlet to an outlet of a horizontal drag conveyor system. The liquid from one particular stage is pumped upwards to flood the bed and displace any air present (i.e., Meichage effect). Then liquid from the next stage is used to displace the liquid present in the bed. This process has been shown to be relatively efficient, attaining relatively good sugar extraction from cane with only three stages compared to 17 to 19 stages needed in conventional diffusers for sugar extraction.

Biomass pretreatment to enhance biodigestibility is often performed in a reactor at high temperatures and pressures in the presence of a liquid (e.g., water) that may contain certain agents, such as acids, alkalis, oxidizers. Efficient heat recovery and, many times, extraction of soluble species generated during pretreatment may be desirable. Accordingly, teachings of certain embodiments recognize the use of displacement extraction, aided by air exclusion (i.e., Meichage effect), to recover heat and soluble species from biomass pretreatment.

As a non-limiting example embodiment, a series of tanks, each representing one stage, may be used to gradually heat or gradually cool down the biomass bed inside a pretreatment reactor. Each time that the liquid present in each tank/stage is sent to the pretreatment reactor, the liquid present in the pretreatment reactor may be allowed to exit and is sent to the next tank/stage. The displacing liquid may flow through the bed as an advancing front similar to the phenomenon that occurs in chromatography columns, where axial mixing ideally does not occur. In this manner, the liquid from the tank may displace the liquid present within the biomass bed at any given time and may allow the exiting liquid to maintain its temperature and soluble species concentration. If the fresh biomass contains natural soluble substances (e.g., sugars, proteins), in particular embodiments, it might be desirable to extract these natural solubles prior to the heating cycle. In addition to conventional methods for extracting natural solubles from crops (e.g., milling, diffusion), a separate set of tanks, arranged in the same fashion as the proposed embodiment for the recovery of heat and soluble species generated during pretreatment, may also be employed.

In particular embodiments, the number of tanks/stages can be any number necessary to attain adequate and cost-effective heat and soluble species recovery. Because of temperature differences, in particular embodiments it may be beneficial to transfer the liquid in such a manner that a denser liquid is located at the bottom of the reactor to avoid undesired liquid buoyancies, which will cause axial mixing. That is, if the liquid in the tank is denser than the liquid in the reactor, it may be introduced at the bottom of the reactor. Conversely, if the liquid in the tank is less dense than the liquid in the reactor, it may be introduced at the top of the reactor.

FIGS. 1A through 1H show one embodiment of a biomass pretreatment system 10. The biomass pretreatment system 10 generally includes a pretreatment reactor 12 configured to contain a biomass and a number of tanks 14 that are each configured to hold a liquid, such as water, at differing temperatures. As will be described in detail below, the tanks 14 are coupled to the pretreatment reactor 12 through a pump that is operable to alternatively pump liquid from each of the plurality of tanks 14 to the pretreatment reactor 12 such that the temperature of the biomass may be raised and lowered with relatively good efficiency.

Each of FIGS. 1A through 1H shows a biomass pretreatment process that may be administered on a biomass contained in the pretreatment reactor 12. In FIG. 1A, a biomass may be loaded into the pretreatment reactor 12 and liquid in each of the tanks 14 elevated to differing temperatures. FIGS. 1A through 1H generally describes a heating cycle in which the temperature of the biomass may be gradually raised to an elevated temperature. Although specific temperatures and number of tanks and reactors are shown, it should be understood that different temperatures and a different number of tanks and/or reactors may be used in other embodiments.

In FIG. 1B, the liquid from tank 14a is transferred to the reactor to flood the biomass bed and remove air, a process known as the Meichage effect. The liquid in tank 14a is maintained at 40° C. Because the biomass in the reactor is colder, this may cause the temperature to drop to approximately 30° C.

In FIG. 1C, the entrained liquid, which is at 30° C., is then displaced by liquid in tank 14b that may be at a temperature of 60° C. The exiting liquid at 30° C. is directed to the tank 14a, whereas the biomass bed and the liquid in the reactor achieve an intermediate equilibrium temperature of approximately 50° C.

In FIG. 1D, the 50° C. liquid in the reactor is then displaced by liquid in the tank 14c that may be at a temperature of 80° C. The 50° C. liquid maintains its temperature and it is sent to the tank 14b. The biomass bed then achieves an intermediate equilibrium temperature of approximately 70° C.

In FIG. 1E, the 70° C. liquid in the reactor is then displaced by liquid in the tank 14d that may be at a temperature of 100° C. The 70° C. liquid maintains its temperature and it is sent to the tank 14c. The biomass bed achieves an intermediate equilibrium temperature of approximately 90° C.

In FIG. 1F, the 90° C. liquid in the reactor is then displaced by liquid in the tank 14e that may be at a temperature of 120° C. The 90° C. liquid maintains its temperature and it is sent to tank 14d. The biomass bed achieves an intermediate equilibrium temperature of approximately 110° C.

In FIG. 1G, the 110° C. liquid in the reactor is then displaced by liquid in the tank 14f that may be at a temperature of 140° C. The 110° C. liquid maintains its temperature and it is sent to tank 14e. The biomass bed achieves an intermediate equilibrium temperature of approximately 130° C.

In FIG. 1H, pretreatment agents may be added to the pretreatment reactor 12 to bring the reactor to a desired reaction temperature. The pretreatment agent(s) may be added before or after the final heating to the desired temperature, although often it is preferred to add it before to use any heat that might be released from diluting the agent in the liquid.

In one embodiment, the pretreatment process described above may use water as the medium and may occur over a period of approximately 6 hours. In this particular embodiment, water is maintained at 160° C., so the whole system may be pressurized to allow pretreatment at these relatively high temperatures. In one embodiment, steam may be injected into the reactor to raise the temperature to the desired level, but any other appropriate heating mechanism can also be employed.

In another embodiment, the displacement extraction cycle for all the stages may take approximately 30 minutes to complete during heating and during cooling. This includes the loading of the biomass before heating and the unloading of the biomass after cooling. After loading the biomass, the pretreatment agent(s) (if any), such as acid, alkali, oxidizers, may be added either before or after heat recovery. In some cases, such as when an agent that has an exothermic heat of dilution is used (e.g., quicklime, sulfuric acid), it might be convenient to add it after heat recovery. This would decrease the heating duty needed from steam or other heating medium. Mixing in the reactor during the pretreatment reaction may be implemented as appropriate (e.g., tumbling, recirculation of liquid through the biomass bed, augering). The number of tanks/stages is six in the embodiment shown in FIGS. 1A-1H, although more or fewer tanks/stages may be used.

FIGS. 2A through 2H show the biomass pretreatment system 10 describing one embodiment of a cooling cycle in which the temperature of the biomass in the pretreatment reactor 12 heated according to the heating cycle of FIGS. 1A through 1H may be gradually lowered.

In FIG. 2A, the biomass in the pretreatment reactor 12 is at an elevated temperature of approximately 160° C. After the pretreatment reactor 12 is at the desired temperature and the appropriate pretreatment agents have been added, the reaction occurs for the desired time. During pretreatment, the temperature in the reactor may be controlled by either providing steam or other appropriate heating material or by cooling water, depending on the thermal nature of the pretreatment reaction. After the desired reaction time has passed, the pretreatment is stopped and the cooling cycle commences.

In FIG. 2B, the 160° C. liquid in the reactor is then displaced by liquid in tank 14e that may be at a temperature of 110° C. The 160° C. liquid maintains its temperature and it is sent to the tank 14f. The biomass bed then achieves an intermediate equilibrium temperature of approximately 120° C.

In FIG. 2C, the 120° C. liquid in the pretreatment reactor 12 is then displaced by liquid in tank 14d at a temperature of 90° C. The 120° C. liquid maintains its temperature and it is sent to tank 14e. The biomass bed then achieves an intermediate equilibrium temperature of approximately 100° C. In one embodiment, liquid at approximately 160° C. in tank 14f may have a relatively high concentration of the soluble species extracted from the pretreatment process. To avoid accumulating these soluble products, a certain amount of this liquid may be purged and sent to a suitable downstream processing mechanism. The purged liquid may be replaced with fresh liquid, which could be at ambient temperature or it could be hot fresh liquid generated from heat integration with other units in the bioconversion process. Although tank 14f is shown as being purged in this embodiment at FIG. 2C, in other embodiments purging may occur directly from the pretreatment reactor 12 instead of transporting the liquid to tank 14f with reference to FIG. 2B. For example, the reactor 12 may be drained of fluid at FIG. 2A (after processing) and the remaining steps of FIGS. 2B-2H may proceed.

In FIG. 2D, the 100° C. liquid in the pretreatment reactor 12 is then displaced by liquid in tank 14c at a temperature of approximately 70° C. The 100° C. liquid maintains its temperature and it is sent to tank 14d. The biomass bed may then have an intermediate equilibrium temperature of approximately 80° C.

In FIG. 2E, the 80° C. liquid in the pretreatment reactor 12 is then displaced by liquid in tank 14b at a temperature of approximately 50° C. The 80° C. liquid maintains its temperature and it is sent to tank 14c. The biomass bed then achieves an intermediate equilibrium temperature of approximately 60° C.

In FIG. 2F, the 60° C. liquid in the pretreatment reactor 12 is then displaced by liquid in tank 14a at a temperature of approximately 30° C. The 60° C. liquid maintains its temperature and it is sent to tank 14b. The biomass bed then achieves an intermediate equilibrium temperature of approximately 40° C.

In FIG. 2G, the 40° C. liquid in the pretreatment reactor 12 is then displaced by fresh water introduced through a fresh water inlet 16 at approximately 30° C. The 40° C. liquid maintains its temperature and it is sent to the tank 14a. The biomass bed then achieves an intermediate equilibrium temperature of approximately 30° C. This liquid is sent to tank 14a where it will be used for the next heating cycle. In one embodiment, the biomass in the pretreatment reactor 12 may be saturated with fresh liquid, thus allowing the pretreated biomass to exit the system as a slurry to a downstream bioconversion. In another embodiment, the pretreated biomass may be free of soluble species, in which the downstream bioconversion may not be necessary. In such an embodiment, each displacement, for example as shown in FIGS. 2B-2F, may pick up soluble species left behind from the immediately preceding displacement. Additionally, in such an embodiment, the fluid leaving the chamber in each respective displacement would have a lesser amount of soluble species than the fluid leaving the chamber in the prior displacement.

In FIG. 2H, the biomass and any entrained liquid may be unloaded from the pretreatment reactor 12.

FIG. 3 shows another embodiment of a process for replacing the liquid from the tank 14f. This particular purging process may be used in place of the purging process as shown in FIG. 2C. After purging the concentrated liquid, some liquid may be transferred sequentially from each tank 14a to tank 14f. Finally, fresh liquid enters the system at tank 14a. In the embodiment described in FIG. 2, the purging and replacing of the liquid in tank 14f is assumed to decrease the temperature from 160° C. to 140° C. At this point, all the temperatures in the tanks 14 are reset to the original temperatures shown in FIG. 1 and are ready to start a new heating cycle.

Figure 4:
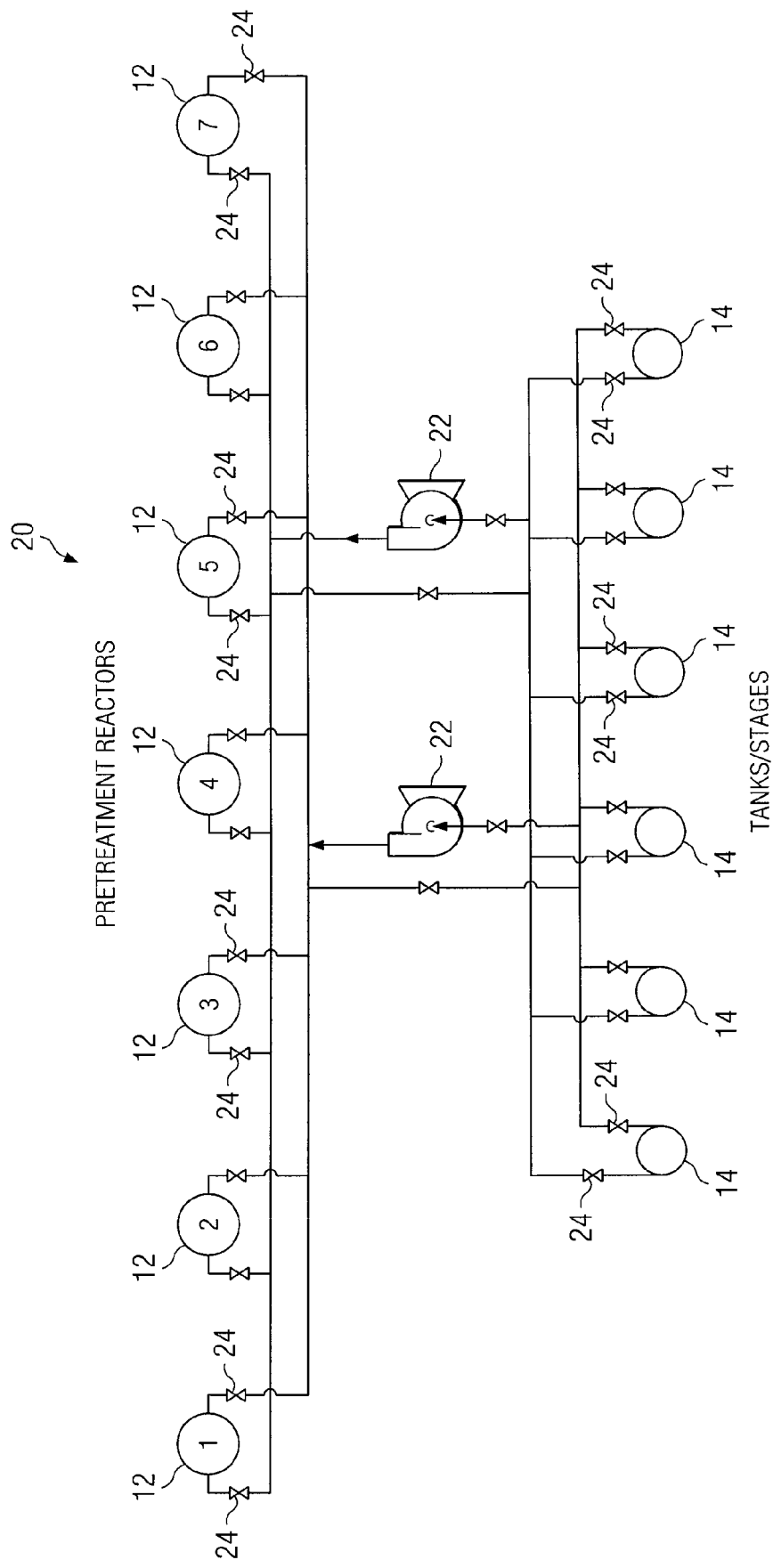
FIG. 4 is a diagram showing another embodiment of biomass pretreatment system in which multiple pretreatment reactors are implemented.

FIG. 4 shows another embodiment of a biomass pretreatment system 20 in which multiple pretreatment reactors 12 may be serviced by the tanks 14. In this particular embodiment, seven pretreatment reactors 12 are shown; however, it should be appreciated that any quantity of pretreatment reactors 12 may be used. In this embodiment, two pumps 22 are used to perform the recovery of heat and soluble species. Movement of the liquid from the two pumps 22 may be provided by valves 24 configured on the inlets and outlets of each of the tanks 14 and pretreatment reactors 12.

Figure 5:
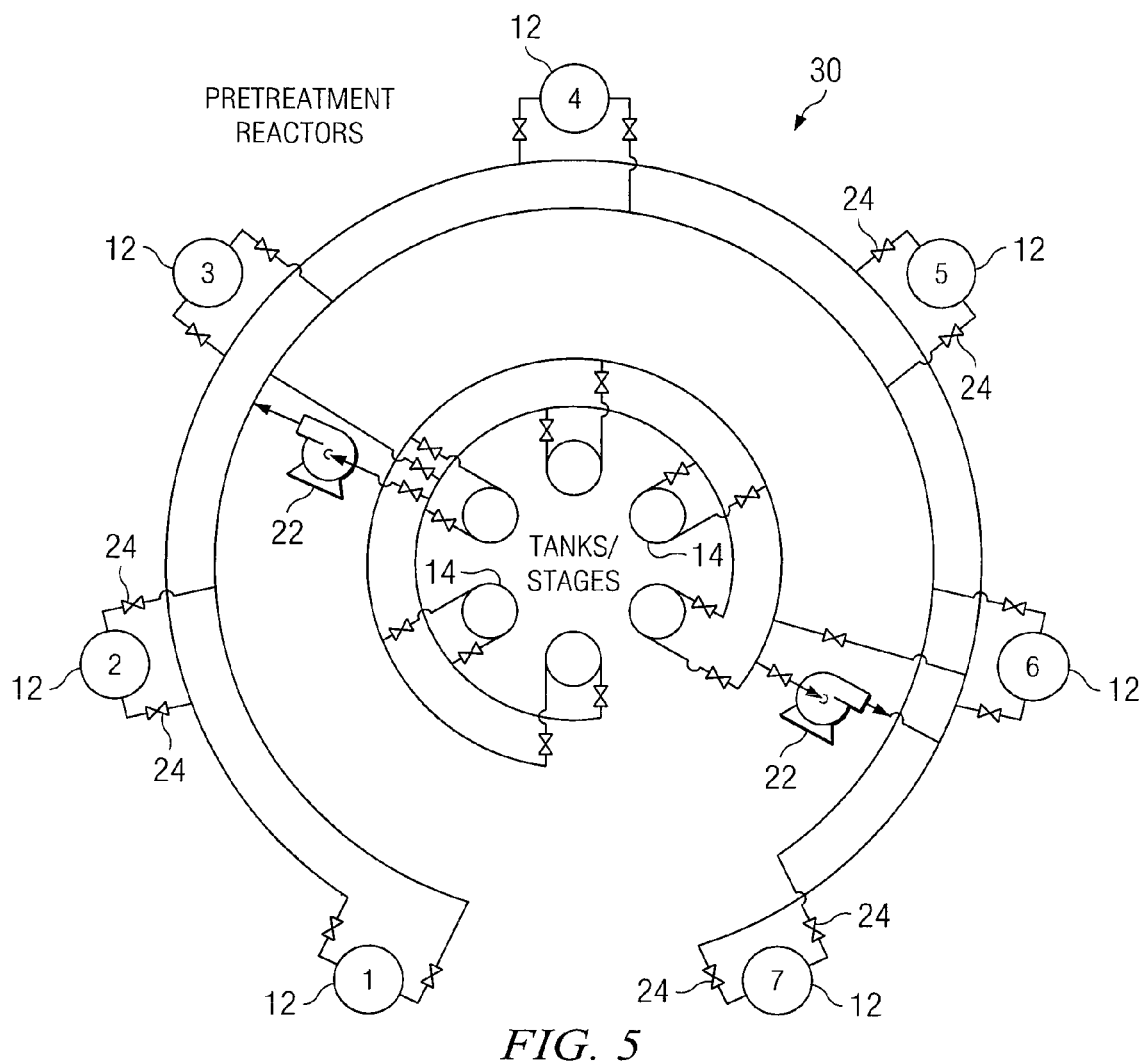
FIG. 5 is a diagram showing another embodiment of biomass pretreatment system in which multiple pretreatment reactors are implemented in a circular arrangement.

FIG. 5 shows another embodiment of the biomass pretreatment system 30 that is similar to the embodiment of FIG. 4 except that the tanks 14 and pretreatment reactors 12 are configured in a circular arrangement for convenience and compactness.

Figure 6:
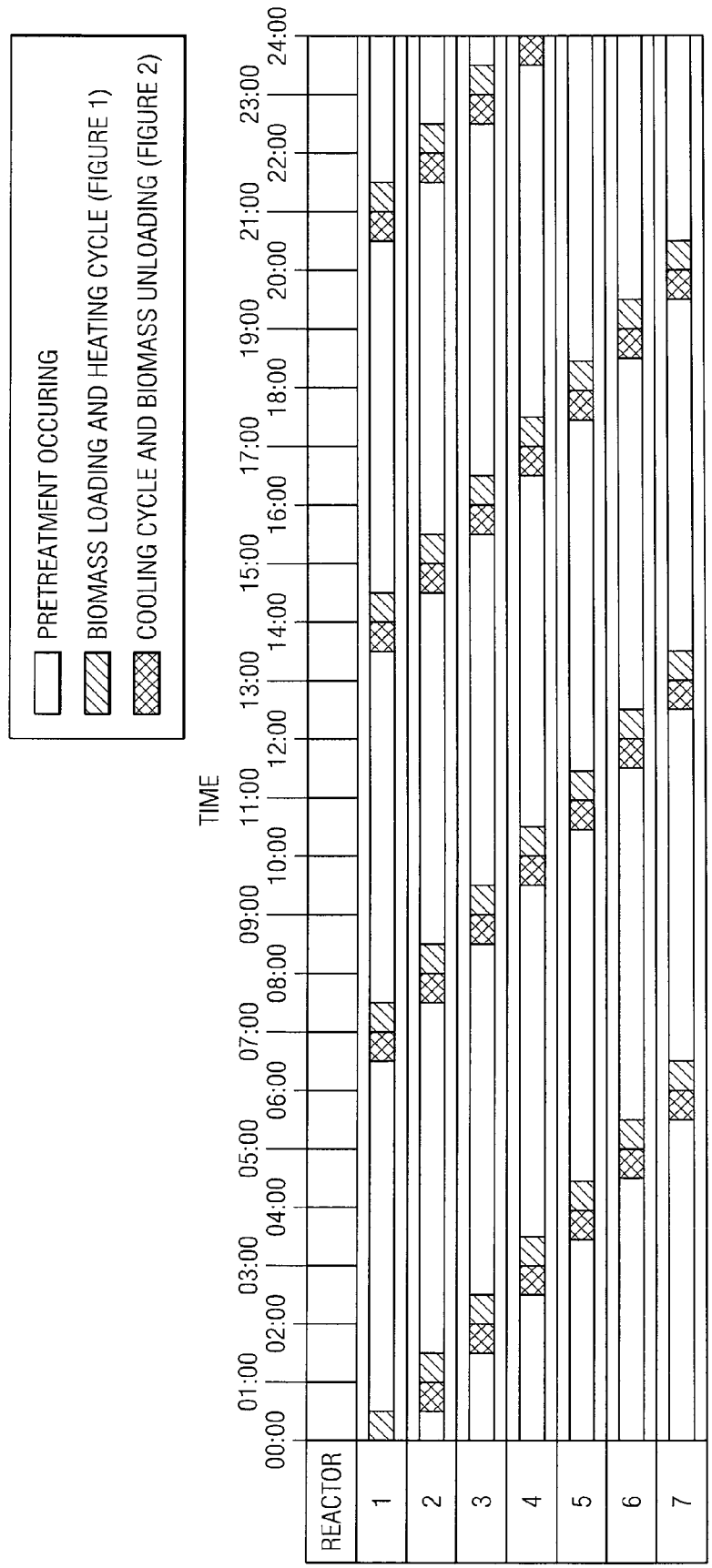
FIG. 6 is a time chart showing one embodiment of implementing a pretreatment process using the embodiments of FIG. 4 or 5.

FIG. 6 is a time chart showing how the two pumps 22 may be used to service each of the seven pretreatment reactors 12 of FIGS. 4 and/or 5. In one embodiment in which the pretreatment takes 6 hours and the heating and cooling cycle take half hour each, then a 24 hour operation schedule for the biomass pretreatment systems 20 and 30 may be accomplished. This schedule is an example of what could be accomplished as a relatively good layout for operation. It can be seen that the operations have been arranged in such a manner that equipment is operated at a relatively high duty cycle, as at any given time there is always one pretreatment reactor 12 being loaded, heated, cooled and unloaded, while the other pretreatment reactors 12 are engaged in pretreatment.

The biomass pretreatment methods that may potentially employ this system can be (but are not limited to) those that are base catalyzed (ammonia, alkaline-peracetic acid, alkaline peroxide, alkaline-solvent, lime, lime under oxygen pressure, sodium hydroxide), non catalyzed (autohydrolysis, hot water, hot water –pH neutral, steam), acid catalyzed (concentrated or dilute acid using sulfuric acid, hydrochloric acid, peracetic acid, phosphoric acid, sulfur dioxide), solvent based (organosolv, other solvents), chemical based (peroxide, wet oxidation). This process use extraction displacement to displace liquid in one or more pretreatment reactors 12 where the pretreatment occurs. Two functions may be realized: (1) water-soluble components generated during pretreatment are extracted and (2) heat is recovered. The pretreatment reactors 12 are accompanied by a series of tanks 14, each one representing one extraction or recovery stage, which are filled and emptied sequentially with the liquid being sent through the pretreatment reactors 12 to displace the liquid present there at any given time. This would allow a gradual and thus more efficient cooling and heating of the biomass in the reactor.

Although the present invention has been described with several embodiments, a myriad of changes, variations, alterations, transformations, and modifications may be suggested to one skilled in the art, and it is intended that the present invention encompass such changes, variations, alterations, transformation, and modifications as they fall within the scope of the appended claims.

What is claimed is:

1. A method for heat recovery from pre-treated biomass comprising:
    transporting a first liquid having a first temperature into a pre-treatment reactor containing biomass, the first liquid elevating the temperature of the biomass to a second temperature;
    removing the first liquid from the pre-treatment reactor;
    transporting a second liquid having a third temperature into the pre-treatment reactor, the second liquid elevating the temperature of the biomass to a fourth temperature greater than about 75° C., and the fourth temperature is higher than the second temperature;
    allowing the biomass in the pre-treatment reactor to undergo a chemical agent-based pre-treatment reaction process at a temperature of at least the fourth temperature, the chemical agent-based pre-treatment reaction process yielding pre-treated biomass and soluble components;
    transporting a third liquid into the pre-treatment reactor at some point after the chemical agent-based pre-treatment reaction process begins, the pre-treated biomass elevating the temperature of the third liquid to a fifth temperature; and
    extracting at least some of the soluble components from the pre-treatment reactor.

2. The method of claim 1, wherein the first liquid is the third liquid, the temperature of the first liquid removed from the pre-treatment reactor containing the biomass is less than the first temperature, and wherein the chemical agent-based pre-treatment reaction process is base catalyzed.

3. The method of claim 1, wherein the third liquid is removed from a second pre-treatment reactor having a second biomass, and the third liquid elevates the temperature of the second biomass to a second temperature.

4. The method of claim 1, further comprising:
    removing the second liquid from the pre-treatment reactor; and
    transporting a fourth liquid into the pre-treatment reactor, the fourth liquid elevating the temperature of the biomass to a sixth temperature, the sixth temperature higher than the fourth temperature, and the biomass undergoing a reaction at a temperature of at least the sixth temperature.

5. The method of claim 4, further comprising:
    transporting a fifth liquid into the pre-treatment reactor at some point after the chemical agent-based pre-treatment reaction process begins, the pre-treated biomass elevating the temperature of the second liquid to a seventh temperature, the seventh temperature higher than the fifth temperature of the third liquid.

6. The method of claim 1, wherein removing the first liquid from the pre-treatment reactor is carried out in a displacement extraction process when the second liquid is transported into the pre-treatment reactor and displaces the first liquid.

7. The method of claim 1,
    wherein the at some point after the chemical agent-based pre-treatment reaction process begins is after the chemical agent-based pre-treatment reaction ends.

8. The method of claim 1, further comprising:
    using the first liquid to accomplish extracting at least some of the soluble components from the pre-treatment reactor, and wherein the first liquid is transported from a first source and the second liquid is transported from a second source.

9. The method of claim 8, wherein the temperature of the first liquid after extracting at least some of the soluble components with the first liquid from the pre-treatment reactor is at the second temperature.

10. The method of claim 8, further comprising:
capturing at least another portion of soluble components in the second liquid; and
removing the at least another portion of soluble components in the second liquid from the pre-treatment reactor.

11. The method of claim 10, wherein the first liquid removed from the pre-treatment reactor has a higher concentration of soluble components than the second liquid removed from the pre-treatment reactor.

12. The method of claim 8, wherein removing the first liquid from the pre-treatment reactor is carried out in a displacement extraction process when the second liquid is transported into the pre-treatment reactor and displaces the first liquid.

13. The method of claim 8, further comprising: purging an additional portion of soluble components from one of the first liquid, the pre-treatment reactor, and combinations thereof.

* * * * *